United States Patent
Terauchi et al.

(10) Patent No.: US 10,968,776 B2
(45) Date of Patent: Apr. 6, 2021

(54) TURBINE SUPPORT STRUCTURE

(71) Applicant: KAWASAKI JUKOGYO KABUSHIKI KAISHA, Kobe (JP)

(72) Inventors: Koji Terauchi, Kobe (JP); Ryoji Tamai, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 20 days.

(21) Appl. No.: 16/137,933

(22) Filed: Sep. 21, 2018

(65) Prior Publication Data

US 2019/0024536 A1 Jan. 24, 2019

Related U.S. Application Data

(63) Continuation of application No. PCT/JP2017/011546, filed on Mar. 22, 2017.

(30) Foreign Application Priority Data

Mar. 24, 2016 (JP) .............................. JP2016-060306

(51) Int. Cl.
*F01D 25/24* (2006.01)
*F02C 7/00* (2006.01)
(Continued)

(52) U.S. Cl.
CPC ............. *F01D 25/246* (2013.01); *F01D 9/04* (2013.01); *F01D 9/041* (2013.01); *F01D 11/08* (2013.01); *F01D 25/243* (2013.01); *F02C 7/00* (2013.01); *F05D 2240/11* (2013.01); *F05D 2240/128* (2013.01); *F05D 2240/14* (2013.01); *F05D 2260/30* (2013.01)

(58) Field of Classification Search
None
See application file for complete search history.

(56) References Cited

U.S. PATENT DOCUMENTS

| 3,319,930 A | * | 5/1967 | Howald | F01D 25/246 415/190 |
| 4,485,620 A | * | 12/1984 | Koenig | F01D 9/023 60/806 |
| 5,192,185 A | * | 3/1993 | Leonard | F01D 11/08 415/170.1 |

FOREIGN PATENT DOCUMENTS

JP 3034519 B1 4/2000

OTHER PUBLICATIONS

International Search Report for PCT/JP2017/011546, dated Jun. 6, 2017.

* cited by examiner

*Primary Examiner* — Juan G Flores
(74) *Attorney, Agent, or Firm* — Sughrue Mion, PLLC

(57) ABSTRACT

Provided is a structure in which nozzles of a turbine of a gas turbine and a shroud of the turbine are supported by a turbine casing. Each nozzle includes an outer circumferential flange having a front end portion and a rear end portion respectively engaged with an inner circumferential portion of the turbine casing, a front end portion of the shroud is engaged with the rear end portion of the outer circumferential flange located frontward thereof, a rear end portion of the shroud is engaged with the front end portion of the outer circumferential flange located rearward thereof, and the nozzle and the shroud are supported by the turbine casing through a support pin penetrating a superposition engagement portion at which engagement portions of the turbine casing, the outer circumferential flange, and the shroud are radially superposed on each other.

14 Claims, 4 Drawing Sheets

(51) Int. Cl.
*F01D 9/04* (2006.01)
*F01D 11/08* (2006.01)

TURBINE SUPPORT STRUCTURE

CROSS REFERENCE TO THE RELATED APPLICATION

This application is a continuation application, under 35 U.S.C. § 111(a), of international application No. PCT/JP2017/011546, filed Mar. 22, 2017, which claims priority to Japanese patent application No. 2016-060306, filed Mar. 24, 2016, the disclosure of which are incorporated by reference in their entirety into this application.

BACKGROUND OF THE INVENTION

Field of the Invention

The present invention relates to a structure for a turbine of a gas turbine engine, in which nozzles and shrouds forming the turbine are supported by a turbine casing that covers the outer circumference of the turbine.

Description of Related Art

Various structures have been each proposed as a structure for a turbine of a gas turbine engine, for supporting nozzles and shrouds. For example, a structure has been known in which a supporting member is fitted to the inner circumference of a turbine casing from both frontward and rearward directions and is fixed by means of bolts, and nozzles and shrouds are engaged with the supporting member (see Patent Document 1).

RELATED DOCUMENT

Patent Document

[Patent Document 1] Japanese Patent No. 3034519

SUMMARY OF THE INVENTION

However, in the above-described structure disclosed in Patent Document 1, the supporting member only for supporting the nozzles and the shrouds is used, resulting in increase in the number of parts and the man-hours of assembling.

In order to solve the above-described problem, an object of the present invention is to provide a turbine support structure that allows nozzles and shrouds to be assuredly supported while allowing reduction in the number of parts and the man-hours of assembling.

In order to attain the above-described object, a turbine support structure according to the present invention is a structure for a turbine of a gas turbine engine, in which a plurality of nozzles and a shroud opposed to a rotor blade adjacent to the nozzles are supported by a turbine casing which covers an outer circumference of the turbine, the nozzles and the shroud forming the turbine, in which each nozzle includes an outer circumferential flange having a front end portion and a rear end portion respectively engaged with an inner circumferential portion of the turbine casing, a front end portion of the shroud is engaged with the rear end portion of the outer circumferential flange positioned frontward of the shroud, and a rear end portion of the shroud is engaged with the front end portion of the outer circumferential flange positioned rearward of the shroud, at only either one of the front end portion and the rear end portion of the outer circumferential flange, a superposition engagement portion is formed at which an engagement portion of the turbine casing, an engagement portion of the outer circumferential flange, and an engagement portion of the shroud are superposed on each other in a radial direction, and the nozzle and the shroud are supported by the turbine casing by means of a support pin penetrating the superposition engagement portion in the radial direction.

With this configuration, the nozzle and the shroud themselves are used and the support pin common among the plurality of members is used so that these members are supported by the turbine casing, whereby it is possible to greatly reduce the number of parts of the turbine and the man-hours of assembling thereof.

In one embodiment of the present invention, the support pin may be disposed at the engagement portion on a front end side of the outer circumferential flange, and a thrust ring through which axial force applied to the outer circumferential flange is transmitted to the turbine casing may be disposed rearward of the outer circumferential flange. With this configuration, by disposing the thrust ring, great axial force applied to a nozzle engagement portion of the outer circumferential flange is prevented from being further applied to the shroud positioned on the rear side relative thereto, whereby these members can be stably supported. Furthermore, the support pin and the thrust ring can be disposed while the positional relationship between the nozzle and the shroud is appropriately maintained.

In one embodiment of the present invention, the nozzle may include a plurality of nozzle division portions obtained by dividing the nozzle in a circumferential direction, the shroud may include shroud division portions that are obtained by dividing the shroud in the circumferential direction and whose number is twice a number of the nozzle division portions, each nozzle division portion may include an outer circumferential flange division portion formed with a center insertion groove at a circumferentially center portion thereof and end-portion insertion grooves at circumferentially opposite end portions thereof, and a plurality of the support pins may be respectively inserted in the center insertion groove and the end-portion insertion grooves, and a gap may be formed between each end-portion insertion groove and the support pin inserted in the end-portion insertion groove, in a state in which the outer circumferential flange division portion is positioned in the circumferential direction by means of the support pin inserted in the center insertion groove. With this configuration, the dimension in the circumferential direction of each shroud division portion is reduced so that the thermal expansion amount thereof is reduced, and over-restraint against thermal expansion of each nozzle division portion can be prevented.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, one embodiment of the present invention will be described with reference to the drawings, but the present invention is not limited to the embodiment.

Figure 1:
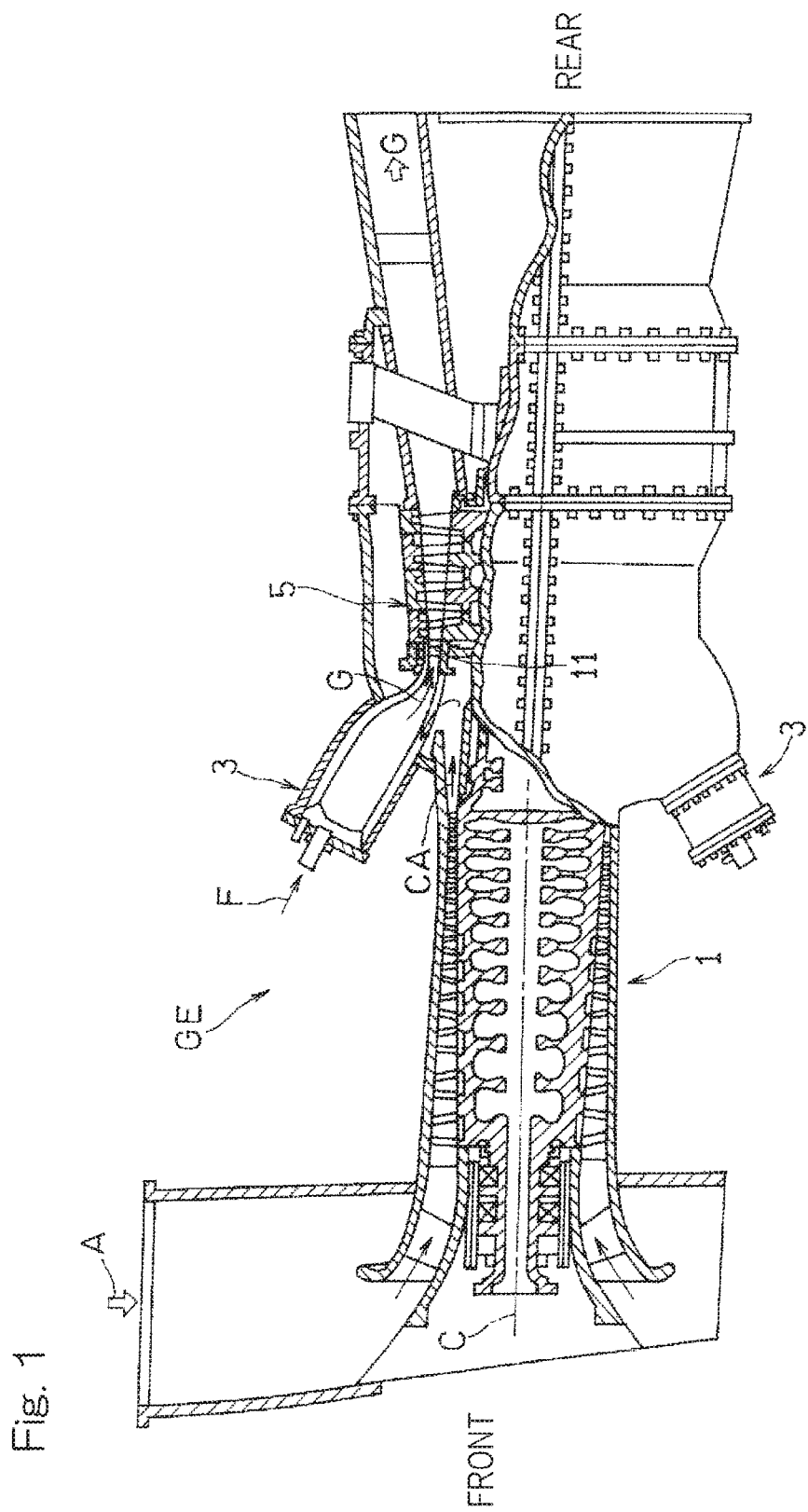
FIG. 1 is a partially-cut-away side view showing a schematic configuration of a gas turbine engine having a support structure according to one embodiment of the present invention.

FIG. 1 is a partially-cut-away side view of a gas turbine engine (hereinafter, simply referred to as a gas turbine) GE having a turbine support structure according to one embodiment of the present invention. In the gas turbine GE, an air A introduced from the outside is compressed by a compressor 1 and guided to a combustor 3, and fuel F is combusted together with the compressed air CA in the combustor 3, so that a turbine 5 is driven by the obtained high-temperature and high-pressure combustion gas G. In the present embodiment, a plurality of combustors 3 of can-type are arranged at equal intervals along a circumferential direction of the gas turbine GE. In the description below, in an axis C direction of the gas turbine GE, the compressor 1 side may be referred to as a "front side" and the turbine 5 side may be referred to as a "rear side". The terms "front" and "rear" included in the names of elements constituting the embodiment are used in the same meanings. In addition, in the description below, unless otherwise specified, the terms "axis direction", "circumferential direction", and "radial direction" respectively mean the axis C direction, the circumferential direction, and the radial direction of the gas turbine GE.

Figure 2:
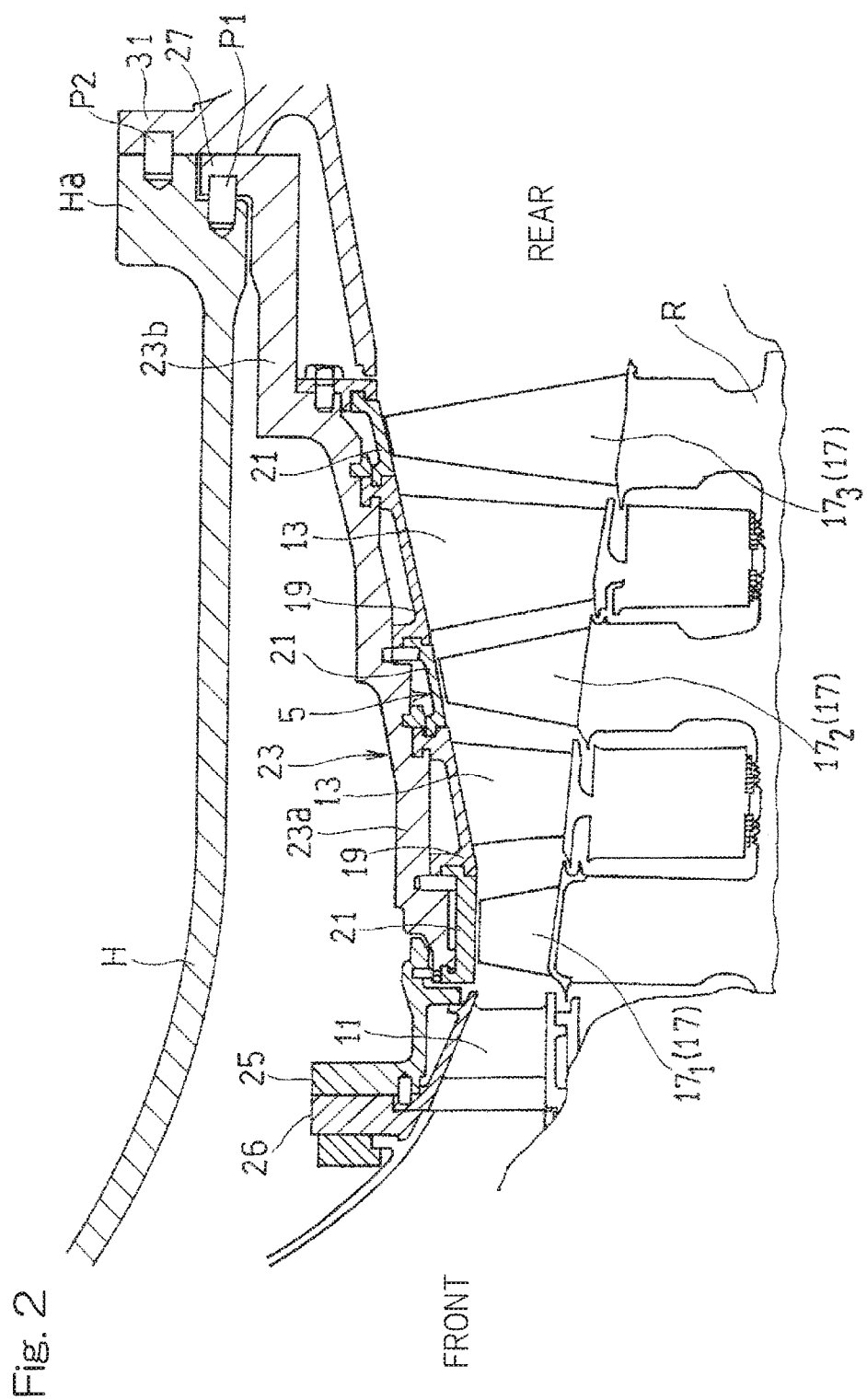
FIG. 2 is an enlarged longitudinal cross-sectional view showing an area at and around a turbine of the gas turbine engine in FIG. 1.

The high-temperature and high-pressure combustion gas G generated in the combustor 3 flows from a first-stage nozzle (first-stage stator blade) 11 of the turbine 5 into the turbine 5. As shown in FIG. 2, in the turbine 5, a plurality of nozzles (stator blades) 13 and a plurality of rotor blades 17 arranged on the outer circumferential surface of a rotor R forming a rotating portion of the gas turbine GE, are alternately arranged in the axis direction so as to be adjacent to each other. Each nozzle 13 includes, at outer circumferential portion thereof, an outer circumferential flange 19 having a conical surface shape. The radially outer sides of the respective rotor blades 17 are covered by shrouds 21. That is, the shrouds 21 are opposed to ends of the respective rotor blades 17 while being distant therefrom in the radial direction. The shrouds 21 and the outer circumferential flanges 19 are alternately arranged in the axis direction so as to be in contact with each other. In the present embodiment, the nozzles 13 and the shrouds 21 are supported by a turbine casing 23 which covers the outer circumference of the turbine 5. In the description below, a shroud 21 disposed so as to oppose an n-th-stage rotor blade $17_n$ may be referred to as an "n-th-stage shroud $21_n$". A structure in which the nozzles 13 and the shrouds 21 are supported by the turbine casing 23 will be described in detail later.

In the present embodiment, the first-stage nozzle 11 of the turbine 5 is supported by a housing H of the gas turbine GE via a first-stage nozzle support body 25 covering the outer circumference of the first-stage nozzle 11. In this specification, the "turbine casing 23" refers to a casing member formed separately from the first-stage nozzle support body 25 and covering the outer circumference of a portion, of the turbine, that is located rearward of the first-stage nozzle 11, i.e., a portion, of the turbine, from a first-stage rotor blade $17_1$ to the rear side. In the description below, unless otherwise specified, the "nozzle 13" refers to a nozzle 13, excluding the first-stage nozzle 11, that are arranged rearward of the first-stage rotor blade $17_1$ (a second-stage nozzle and a third-stage nozzle in the shown example). The turbine casing 23 is not of a divided type in which the turbine casing 23 is divided into two parts in the circumferential direction, but is a one-piece component. Therefore, the nozzles 13, the rotor blades 17, the shrouds 21, and the like are incorporated into the turbine casing 23 from the rear side.

As shown in FIG. 2, the outer circumferential surface of the turbine 5 is formed by the multiple outer circumferential flanges 19 and shrouds 21 as a partial conical surface having a diameter that increases toward the rear side substantially linearly in a vertical cross-sectional view. The turbine casing 23 includes: a casing body portion 23a which is a portion covering the outer circumference of the turbine 5; and a cylindrical connection portion 23b extending from the casing body portion 23a toward the rear side. The casing body portion 23a covering the outer circumference of the turbine 5 has such a shape that the diameter thereof increases toward the rear side. A rear end flange 27 is provided at the rearmost end of the connection portion 23b so as to protrude radially outward. The turbine casing 23 is supported at the rear end flange 27 between a rear end portion Ha of the housing H of the gas turbine GE and a rear duct 31 in a state of being positioned by being connected to the rear end portion Ha by means of a connection member such as a connection pin P1. The rear duct 31 is connected to the rear end portion Ha by means of a bolt which is not shown. The portion between the housing H and the rear duct 31 is positioned by means of a connection pin P2.

Hereinafter, the structure in which the nozzles 13 and the shrouds 21 are supported by the turbine casing 23 will be described. The support structure according to the present embodiment is applied particularly to a shroud 21 disposed between two nozzles 13, 13 (second-stage shroud $21_2$ in the shown example) and the two nozzles 13, 13 respectively disposed on opposite front and rear sides of the shroud 21, among the plurality of nozzles 13 and the plurality of shrouds 21 shown in FIG. 3. In the shown example, the only shroud 21 to which the support structure according to the present embodiment is applied is the second-stage shroud $21_2$, but the number of the nozzles 13 and the number of the shrouds 21 may be more than those in the shown example. In that case, the support structure according to the present embodiment may be applied to a plurality of the shrouds 21.

Figure 3:
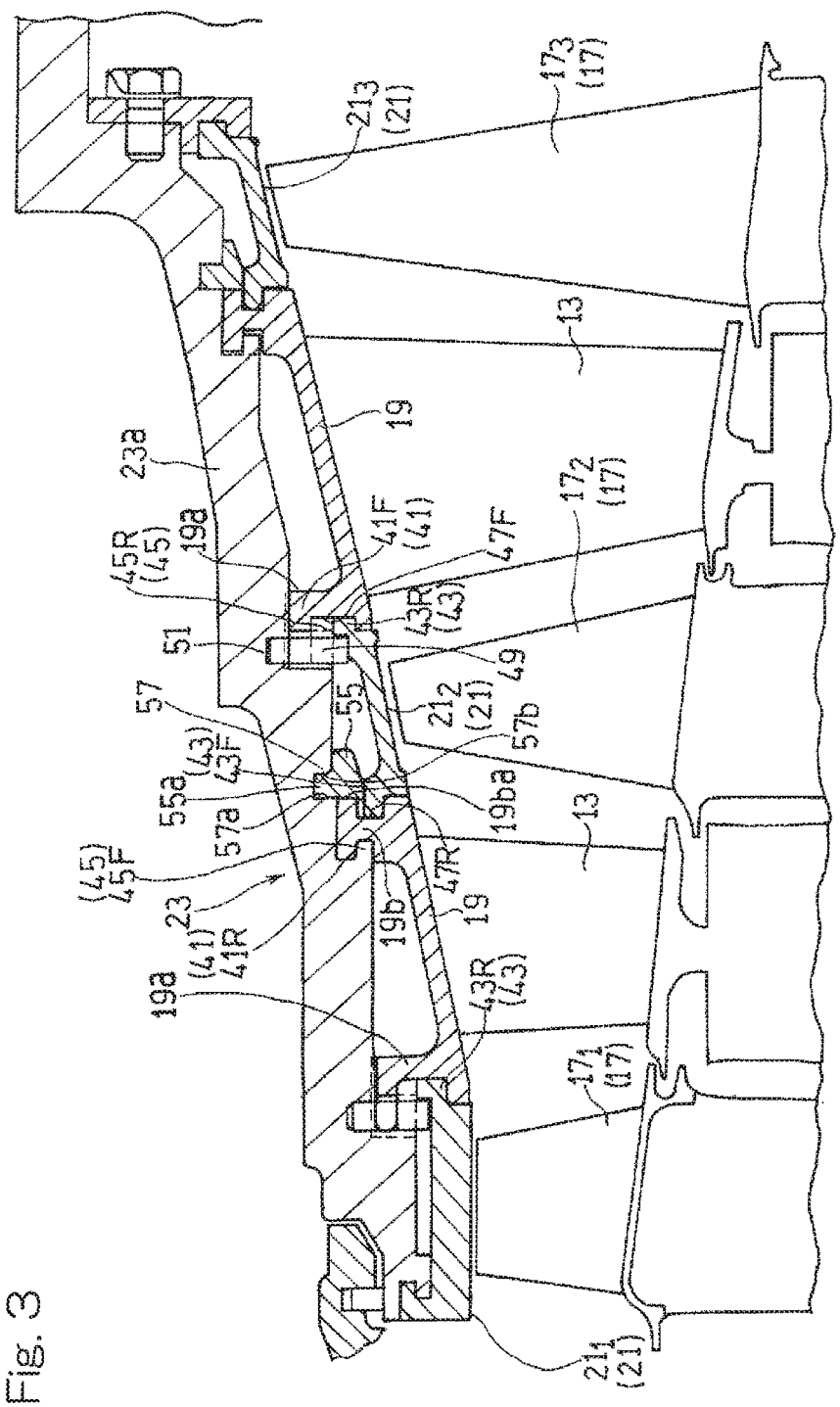
FIG. 3 is an enlarged longitudinal cross-sectional view showing an area at and around the support structure in FIG. 2.

As shown in FIG. 3, the outer circumferential flange 19 of the nozzle 13 is provided with nozzle engagement portions 41 protruding therefrom. The shroud 21 is provided with shroud engagement portions 43 protruding therefrom. An inner circumferential portion of the turbine casing 23A is provided with a casing engagement portion 45 protruding therefrom and configured to be engaged with the nozzle engagement portion 41. In the shown example, a plurality (two in this example) of the casing engagement portions 45 of the turbine casing 23 are formed at different axial positions. In the following description, an engagement portion, which is provided on the front side, of the two casing engagement portions 45, 45 may be referred to as a front-side casing engagement portion 45F, and an engagement portion, which is provided on the rear side, of the two casing engagement portions 45, 45 may be referred to as a rear-side casing engagement portion 45R.

As the nozzle engagement portions 41, a front-side nozzle engagement portion 41F which is a protrusion piece protruding toward the front side is provided at a front end portion of the outer circumferential flange 19 of the nozzle 13, and a rear-side nozzle engagement portion 41R which is a protrusion piece protruding toward the front side is provided at a rear end portion of the outer circumferential flange 19. In addition, a front-side shroud engagement portion 43F which is a protrusion piece protruding toward the front side is provided at a front end portion of the second-stage shroud $21_2$, and a rear-side shroud engagement portion 43R which is a protrusion piece protruding toward the rear side is provided at a rear end portion of the second-stage shroud $21_2$.

Furthermore, in the present embodiment, the outer circumferential flange 19 is formed with nozzle engaged portions 47 serving as engaged portions with which the shroud engagement portions 43 of the shroud 21 are engaged. In the shown example, as the nozzle engaged portions 47, a front-side nozzle engaged portion 47F which is a recessed portion recessed toward the rear side is provided at the front end portion of the outer circumferential flange 19, and a rear-side nozzle engaged portion 47R which is a recessed portion recessed toward the front side is provided at the rear end portion of the outer circumferential flange 19.

More specifically, a front-end flange portion 19a protruding radially outward is provided over the entire circumference of a portion that is located slightly rearward of a front-end surface of the outer circumferential flange 19, and the front-side nozzle engagement portion 41F is provided so as to protrude from the outer edge of the front-end flange portion 19a to the front side. A recessed portion formed between the front end portion of the outer circumferential flange 19 and the front-side nozzle engagement portion 41F forms the front-side nozzle engaged portion 47F. On the other hand, a rear-end flange portion 19b protruding radially outward is provided over the entire circumference at a position that is present slightly frontward of a rear end surface of the outer circumferential flange 19. The rear-side nozzle engagement portion 41R of the outer circumferential flange 19 is provided so as to protrude from the outer edge of the rear-end flange portion 19b to the front side. The rear-side nozzle engaged portion 47R is formed as a recessed portion recessed from the rear end surface of the outer circumferential flange 19 to the front side.

In the present embodiment, the turbine casing 23, the outer circumferential flanges 19 of the nozzles 13, and the shroud 21 having such structures are engaged with one another in the following manner.

The front end portion (front-side nozzle engagement portion 41F) and the rear end portion (rear-side nozzle engagement portion 41R) of the outer circumferential flanges 19 of the nozzles 13 are respectively engaged with the casing engagement portions 45 (the rear-side casing engagement portion 45R and the front-side casing engagement portion 45F) formed on the inner circumferential portion of the turbine casing 23. The front end portion (front-side shroud engagement portion 43F) of the shroud 21 is engaged with the rear end portion (rear-side nozzle engaged portion 47R) of the outer circumferential flange 19 positioned frontward of the shroud 21, and the rear end portion (rear-side shroud engagement portion 43R) of the shroud 21 is engaged with the front end portion (front-side nozzle engaged portion 47F) of the outer circumferential flange 19 positioned rearward of the shroud 21.

At only either one of the front end portion and the rear end portion of the outer circumferential flange 19 (in the shown example, the front end portion of the outer circumferential flange 19 on the rear side), a superposition engagement portion 49 is formed at which the casing engagement portion 45 of the turbine casing 23, the nozzle engagement portion 41 of the outer circumferential flange 19, and the shroud engagement portion 43 of the shroud 21 are superposed on each other in the radial direction. In the shown example, the superposition engagement portion 49 is formed by members engaged with one another at the front end portion of the outer circumferential flange 19 on the rear side, i.e., the front-side nozzle engagement portion 41F, the rear-side casing engagement portion 45R, and the rear-side shroud engagement portion 43R. A support pin 51 which is a common member thereamong penetrates the superposition engagement portion 49 in the radial direction. A plurality of the support pins 51 are provided in the circumferential direction. The nozzle 13 and the shroud 21 are positioned and supported in the circumferential direction with respect to the turbine casing 23 by means of the support pins 51. By the nozzle 13 and the shroud 21 being thus positioned in the circumferential direction by mean of the common support pins 51, the number of parts can be reduced. The shapes of the engagement portions and the engaged portions are not limited to those in the shown example.

A thrust ring 55 of an annular shape is disposed rearward of the rear-side nozzle engagement portion 41R of the outer circumferential flange 19. In the shown example, the thrust ring 55 is formed so as to have a substantially L-shaped cross section. The inner circumferential surface of the turbine casing 23A is formed with a fitting groove 57 which is recessed radially outward, and the thrust ring 55 is fitted into the fitting groove 57. More specifically, the thrust ring 55 having a substantially L-shaped cross section has an annular protrusion portion 55a protruding radially outward, and the annular protrusion portion 55a is fitted into the fitting groove 57. A wall surface (wall surface facing the rear side) 57a on the front side of the fitting groove 57 is formed at such a position as to be substantially aligned with a rear end surface 19b a of the rear-end flange portion 19b of the outer circumferential flange 19 (i.e., the rear end surface of the rear-side nozzle engagement portion 41R of the outer circumferential flange 19) in a state in which the outer circumferential flange 19 is engaged with the casing engagement portion 45. Therefore, axial force applied to the rear-side nozzle engagement portion 41R is transmitted to the turbine casing 23 (more specifically, a wall surface 57b on the rear side of the fitting groove 57) through the thrust ring 55. The thrust ring 55 may be omitted. However, by provision of the thrust ring 55, great axial force applied to the nozzle engagement portion 41 of the outer circumferential flange 19 is prevented from being further applied to the shroud 21 adjacent thereto at the rear side, whereby these members can be stably supported by the turbine casing 23. Moreover, by disposing the support pin 51 at the front-side nozzle engagement portion 41F on the front end side of the outer circumferential flange 19, the support pin 51 and the thrust ring 55 can be disposed while the positional relationship between the nozzle 13 and the shroud 21 is appropriately maintained.

In the shown example, the thrust ring 55 is disposed so as to be in contact with the outer circumferential surface of the front-side shroud engagement portion 43F of the second-stage shroud $21_2$. Accordingly, the thrust ring 55 can be stably disposed with use of the shroud 21 engaged with the outer circumferential flange 19. The thrust ring 55 according to the present embodiment is formed as a snap ring, and is fitted into the fitting groove 57 in a state of being reduced in diameter.

Figure 4:
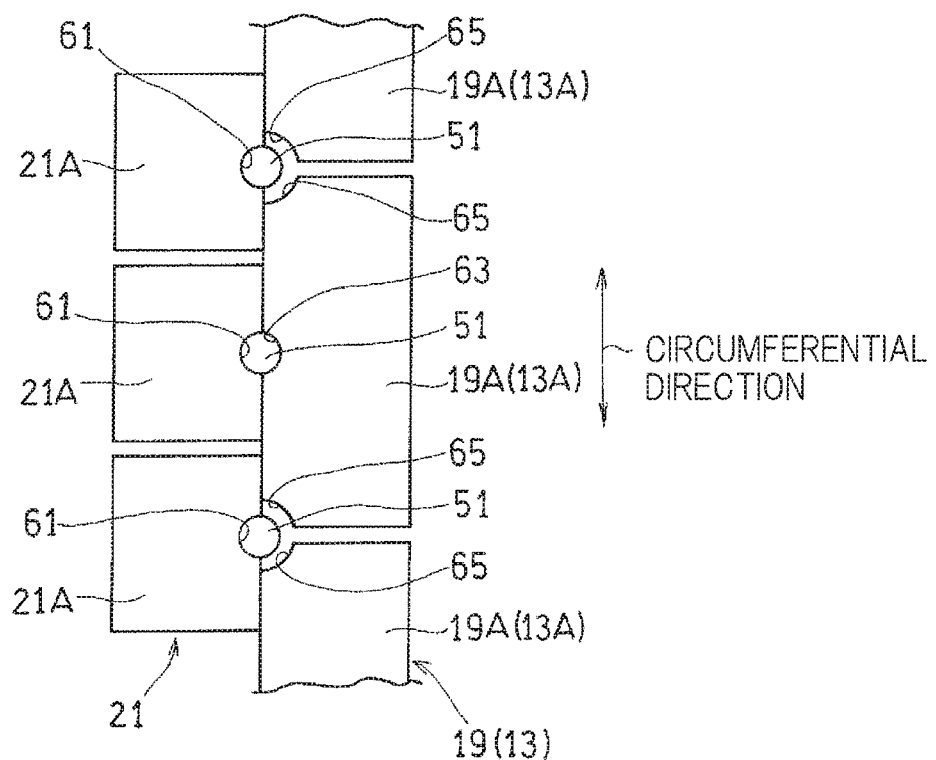
FIG. 4 is a schematic diagram showing an arrangement in the circumferential direction of a nozzle and a shroud of the turbine in FIG. 2.

Next, an arrangement in the circumferential direction of the nozzle 13 and the shroud 21 will be described. As shown in FIG. 4, in the present embodiment, the nozzle 13 includes a plurality of nozzle division portions 13A obtained by dividing the nozzle 13 in the circumferential direction. Outer circumferential flange division portions 19A obtained by dividing the outer circumferential flange 19 in the circumferential direction are formed on outer circumferential portions of the respective nozzle division portions 13A. The shroud 21 includes a plurality of shroud division portions 21A obtained by dividing the shroud 21 in the circumferential direction. The number of the shroud division portions 21A arranged in the circumferential direction is twice the number of the nozzle division portions 13A. In other words, the dimension in the circumferential direction of each of the shroud division portions 21A is about half the dimension in the circumferential direction of each of the outer circumferential flange division portions 19A of the nozzle division portions 13A. As an example, the number of the shroud division portions 21A to be arranged in the circumferential direction is set to 24 and the number of the nozzle division portions 13A to be arranged in the circumferential direction is set to 12. Gaps for absorbing thermal expansion are set in advance between the adjacent shroud division portions 21A and between the adjacent outer circumferential flange division portions 19A.

The plurality of shroud division portions 21A are arranged as follows on the basis of the positions in the circumferential direction of the outer circumferential flange division portions 19A. That is, the plurality of shroud division portions 21A are disposed such that shroud division portions 21A of which the central positions in the circumferential direction coincide with the central positions in the circumferential direction of the outer circumferential flange division portions 19A, and shroud division portions 21A of which the central positions in the circumferential direction coincide with portions between the adjacent outer circumferential flange division portions 19A, are alternately arranged.

Each shroud division portion 21A has a side portion formed with a shroud insertion groove 61 having an arc-shaped cross section having an inner diameter that is substantially equal to the outer diameter of the support pin 51. On the other hand, each outer circumferential flange division portion 19A has a side portion formed with a nozzle center insertion groove 63 positioned at the center thereof in the circumferential direction, and nozzle end-portion insertion grooves 65 positioned in opposite end portions thereof in the circumferential direction. The nozzle center insertion groove 63 of the outer circumferential flange division portion 19A is formed as a groove having an arc-shaped cross section having an inner diameter that is substantially equal to the outer diameter of the support pin 51. Each nozzle end-portion insertion groove 65 is formed as a groove having an arc-shaped cross section having an inner diameter larger than the outer diameter of the support pin 51. Therefore, in a state in which the outer circumferential flange division portion 19A is positioned in the circumferential direction by means of the support pin 51 inserted in the nozzle center insertion groove 63, a gap is formed between the nozzle end-portion insertion groove 65 and the support pin 51 inserted in the nozzle end-portion insertion groove 65.

The shroud division portions 21A are curved plate-shaped members, and thus are easily deformed owing to influence of heat from the turbine 5. Thus, by increasing the number of division performed in the circumferential direction to obtain the shroud division portions 21A as described above, the dimensions thereof in the circumferential direction can be reduced so that the thermal deformation amount of each shroud division portion 21A can be reduced. In addition, each shroud division portion 21A is assuredly positioned in the circumferential direction while over-restraint against thermal expansion is prevented, by means of one support pin 51 and the shroud insertion groove 61 which forms no gap therewith. Also the outer circumferential flange division portion 19A of each nozzle is assuredly positioned in the circumferential direction by means of one support pin 51 and the nozzle center insertion groove 63 which forms no gap therewith, and meanwhile, the nozzle end-portion insertion grooves 65 face the support pins 51 positioned at opposite end portions in the circumferential direction with gaps therebetween, whereby over-restraint against thermal expansion is prevented.

With the turbine support structure according to the present embodiment, as shown in FIG. 2, the nozzles 13 and the shrouds 21 themselves are used and the support pins common among the plurality of members are used so that these members are supported by the turbine casing 23, whereby it is possible to greatly reduce the number of parts of the turbine 5 and the man-hours of assembling thereof.

Although the present invention has been described above in connection with the preferred embodiment thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

5 . . . Turbine
13 . . . Nozzle
17 . . . Rotor blade
19 . . . Outer circumferential flange of nozzle
21 . . . Shroud
23 . . . Turbine casing
41 . . . Nozzle engagement portion
43 . . . Shroud engagement portion
45 . . . Casing engagement portion
49 . . . Superposition engagement portion
51 . . . Support pin
55 . . . Thrust ring
GE . . . Gas turbine engine

What is claimed is:

1. A turbine support structure for a turbine of a gas turbine engine, the turbine support structure comprising:
a plurality of nozzles; and
a shroud opposed to a rotor blade adjacent to the plurality of nozzles are supported by a turbine casing which covers an outer circumference of the turbine, the plurality of nozzles and the shroud forming the turbine, wherein
each nozzle includes an outer circumferential flange having a front end portion and a rear end portion respectively engaged with an inner circumferential portion of the turbine casing, a front end portion of the shroud is engaged with the rear end portion of the outer circumferential flange positioned frontward of the shroud, and a rear end portion of the shroud is engaged with the front end portion of the outer circumferential flange positioned rearward of the shroud, at only either one of the front end portion and the rear end portion of the outer circumferential flange, a superposition engagement portion is formed at which an engagement portion of the turbine casing, an engagement portion of the outer circumferential flange, and an engagement portion of the shroud are superposed on each other in a radial direction, and a nozzle of the plurality of nozzles and the shroud are supported by the turbine casing by means of a support pin penetrating the superposition engagement portion in the radial direction, wherein the nozzle of the plurality of nozzles includes a plurality of nozzle division portions obtained by dividing the nozzle in a circumferential direction, the shroud includes shroud division portions that are obtained by dividing the shroud in the circumferential direction and whose number is twice a number of the plurality of nozzle division portions, each nozzle division portion includes an outer circumferential flange division portion formed with a center insertion groove at a circumferentially center portion thereof and end-portion insertion grooves at circumferentially opposite end portions thereof, and a plurality of the support pins are respectively inserted in the center insertion groove and the end-portion insertion grooves, and a gap is formed between each end-portion insertion groove and the support pin inserted in the end-portion insertion groove, in a state in which the outer circumferential flange division portion is positioned in the circumferential direction by means of the respective support pin inserted in the center insertion groove.

2. The turbine support structure as claimed in claim 1, wherein the support pin is disposed at the engagement portion on a front end side of the outer circumferential flange, and a thrust ring through which axial force applied to the outer circumferential flange is transmitted to the turbine casing is disposed rearward of the outer circumferential flange.

3. A turbine support structure for a turbine of a gas turbine engine, the turbine support structure comprising:

a plurality of nozzles; and a shroud opposed to a rotor blade adjacent to the plurality of nozzles are supported by a turbine casing which covers an outer circumference of the turbine, the plurality of nozzles and the shroud forming the turbine, wherein each nozzle includes an outer circumferential flange having a front end portion and a rear end portion respectively engaged with an inner circumferential portion of the turbine casing, a front end portion of the shroud is engaged with the rear end portion of the outer circumferential flange positioned frontward of the shroud, and a rear end portion of the shroud is engaged with the front end portion of the outer circumferential flange positioned rearward of the shroud, at only either one of the front end portion and the rear end portion of the outer circumferential flange, a superposition engagement portion is formed at which an engagement portion of the turbine casing, an engagement portion of the outer circumferential flange, and an engagement portion of the shroud are superposed on each other in a radial direction, an outer surface of the engagement portion of the turbine casing, in the radial direction, directly contacts an inner surface of the engagement portion of the outer circumferential flange, in the radial direction, and a nozzle of the plurality of nozzles and the shroud are supported by the turbine casing by means of a support pin penetrating the superposition engagement portion in the radial direction.

4. The turbine support structure as claimed in claim 3, wherein the support pin is disposed at the engagement portion on a front end side of the outer circumferential flange, and a thrust ring through which axial force applied to the outer circumferential flange is transmitted to the turbine casing is disposed rearward of the outer circumferential flange.

5. The turbine support structure as claimed in claim 4, wherein the nozzle of the plurality of nozzles includes a plurality of nozzle division portions obtained by dividing the nozzle in a circumferential direction, the shroud includes shroud division portions that are obtained by dividing the shroud in the circumferential direction and whose number is twice a number of the plurality of nozzle division portions, each nozzle division portion includes an outer circumferential flange division portion formed with a center insertion groove at a circumferentially center portion thereof and end-portion insertion grooves at circumferentially opposite end portions thereof, and a plurality of the support pins are respectively inserted in the center insertion groove and the end-portion insertion grooves, and a gap is formed between each end-portion insertion groove and the respective support pin inserted in the end-portion insertion groove, in a state in which the outer circumferential flange division portion is positioned in the circumferential direction by means of the respective support pin inserted in the center insertion groove.

6. The turbine support structure as claimed in claim 3, wherein the nozzle of the plurality of nozzles includes a plurality of nozzle division portions obtained by dividing the nozzle in a circumferential direction, the shroud includes shroud division portions that are obtained by dividing the shroud in the circumferential direction and whose number is twice a number of the plurality of nozzle division portions, each nozzle division portion includes an outer circumferential flange division portion formed with a center insertion groove at a circumferentially center portion thereof and end-portion insertion grooves at circumferentially opposite end portions thereof, and a plurality of the support pins are respectively inserted in the center insertion groove and the end-portion insertion grooves, and a gap is formed between each end-portion insertion groove and the respective support pin inserted in the end-portion insertion groove, in a state in which the outer circumferential flange division portion is positioned in the circumferential direction by means of the respective support pin inserted in the center insertion groove.

7. The turbine support structure as claimed in claim 3, wherein an inner surface of the engagement portion of the turbine casing, in the radial direction, directly contacts an outer surface of the engagement portion of the shroud, in the radial direction.

8. The turbine support structure as claimed in claim 3, wherein
the outer circumferential flange includes a recessed portion formed between one end portion of the outer circumferential flange and the engagement portion of the outer circumferential flange,
the engagement portion of the turbine casing and the engagement portion of the shroud together engage the recessed portion, and
the one end portion of the outer circumferential flange is one from among the front end portion and the rear end portion of the outer circumferential flange at which the superposition engagement portion is formed.

9. The turbine support structure as claimed in claim 3, wherein
the engagement portion of the turbine casing is provided so as to protrude toward a rear side.

10. A turbine support structure for a turbine of a gas turbine engine, the turbine support structure comprising:
a plurality of nozzles; and
a shroud opposed to a rotor blade adjacent to the plurality of nozzles are supported by a turbine casing which covers an outer circumference of the turbine, the plurality of nozzles and the shroud forming the turbine, wherein
each nozzle includes an outer circumferential flange having a front end portion and a rear end portion respectively engaged with an inner circumferential portion of the turbine casing,
a front end portion of the shroud is formed with a front-side shroud engagement portion in a form of a protrusion piece protruding toward a front side, the front-side shroud engagement portion being engaged with the rear end portion of the outer circumferential flange positioned frontward of the shroud, and a rear end portion of the shroud is formed with a rear-side shroud engagement portion in a form of a protrusion piece protruding toward a rear side, the rear-side shroud engagement portion being engaged with the front end portion of the outer circumferential flange positioned rearward of the shroud,
at only either one of the front end portion and the rear end portion of the outer circumferential flange, a superposition engagement portion is formed at which an engagement portion of the turbine casing, an engagement portion of the outer circumferential flange, and one from among the front-side shroud engagement portion and the rear-side shroud engagement portion of the shroud are superposed on each other in a radial direction, and
a nozzle of the plurality of nozzles and the shroud are supported by the turbine casing by means of a support pin penetrating the superposition engagement portion in the radial direction.

11. The turbine support structure as claimed in claim 10, wherein the support pin is disposed at the engagement portion on a front end side of the outer circumferential flange, and a thrust ring through which axial force applied to the outer circumferential flange is transmitted to the turbine casing is disposed rearward of the outer circumferential flange.

12. The turbine support structure as claimed in claim 11, wherein
the nozzle of the plurality of nozzles includes a plurality of nozzle division portions obtained by dividing the nozzle in a circumferential direction,
the shroud includes shroud division portions that are obtained by dividing the shroud in the circumferential direction and whose number is twice a number of the plurality of nozzle division portions,
each nozzle division portion includes an outer circumferential flange division portion formed with a center insertion groove at a circumferentially center portion thereof and end-portion insertion grooves at circumferentially opposite end portions thereof, and a plurality of the support pins are respectively inserted in the center insertion groove and the end-portion insertion grooves, and
a gap is formed between each end-portion insertion groove and the respective support pin inserted in the end-portion insertion groove, in a state in which the outer circumferential flange division portion is positioned in the circumferential direction by means of the respective support pin inserted in the center insertion groove.

13. The turbine support structure as claimed in claim 10, wherein
the nozzle of the plurality of nozzles includes a plurality of nozzle division portions obtained by dividing the nozzle in a circumferential direction,
the shroud includes shroud division portions that are obtained by dividing the shroud in the circumferential direction and whose number is twice a number of the plurality of nozzle division portions,
each nozzle division portion includes an outer circumferential flange division portion formed with a center insertion groove at a circumferentially center portion thereof and end-portion insertion grooves at circumferentially opposite end portions thereof, and a plurality of the support pins are respectively inserted in the center insertion groove and the end-portion insertion grooves, and
a gap is formed between each end-portion insertion groove and the respective support pin inserted in the end-portion insertion groove, in a state in which the outer circumferential flange division portion is positioned in the circumferential direction by means of the respective support pin inserted in the center insertion groove.

14. The turbine support structure as claimed in claim 10, wherein an outer surface of the engagement portion of the turbine casing, in the radial direction, directly contacts an inner surface of the engagement portion of the outer circumferential flange, in the radial direction.

* * * * *